Figure 1:
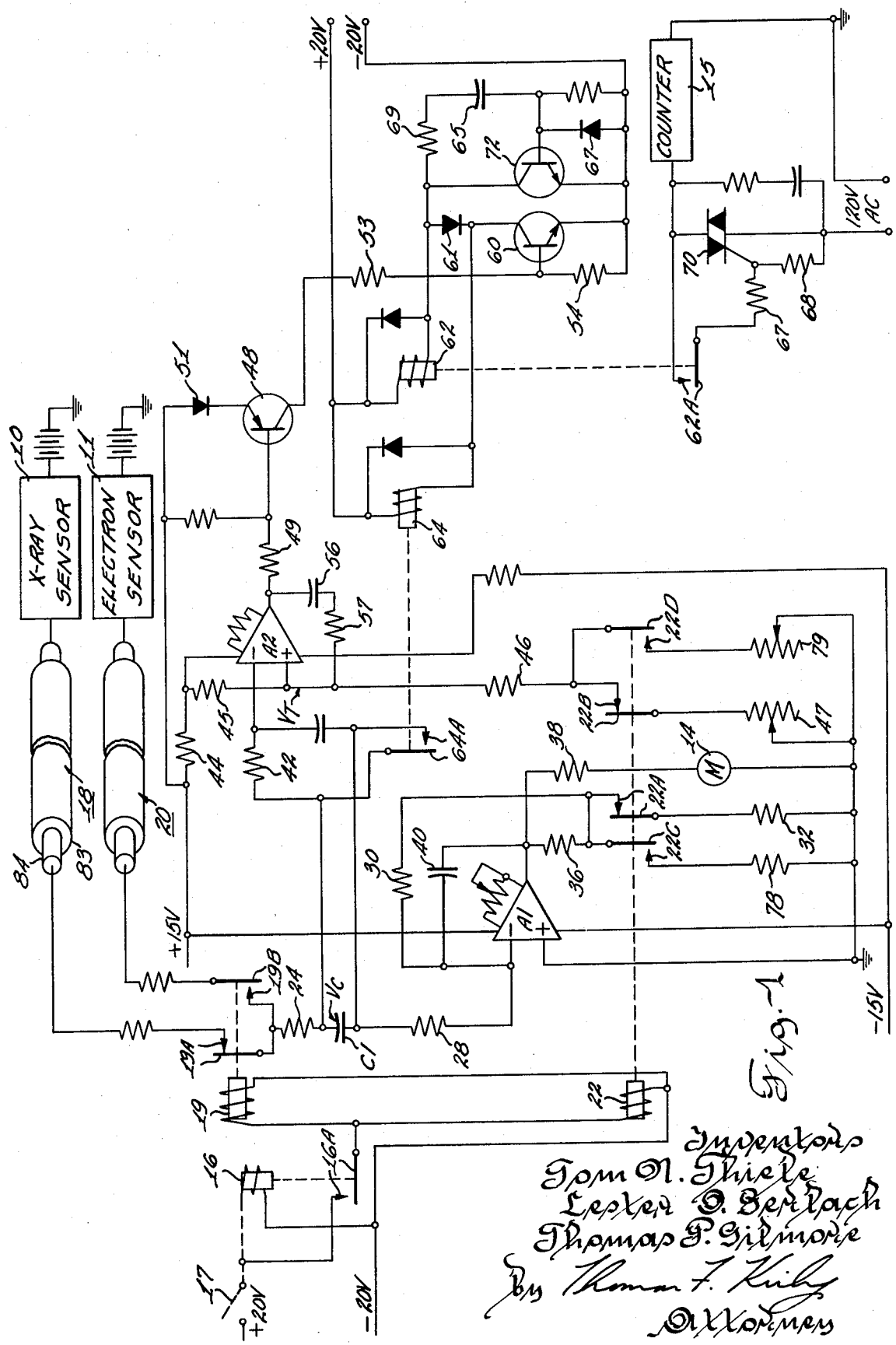

United States Patent
Thiele et al.

[15] 3,671,746
[45] June 20, 1972

[54] STABLE, LOW LEVEL RADIATION MONITOR

[72] Inventors: Tom N. Thiele, Oconomowoc; Lester O. Gerlach, Muskego; Thomas P. Gilmore, Wauwatosa, all of Wis.

[73] Assignee: Allis-Chalmers Manufacturing Company, Milwaukee, Wis.

[22] Filed: June 2, 1970

[21] Appl. No.: 42,739

[52] U.S. Cl. .................................. 250/83.3 R, 250/83.6 R
[51] Int. Cl. ........................................................ G01t 1/16
[58] Field of Search ............................... 250/83.3 R, 83.6 R

[56] References Cited

UNITED STATES PATENTS

| | | | |
|---|---|---|---|
| 3,288,997 | 11/1966 | McCall | 250/83.3 R X |
| 3,492,480 | 1/1970 | Vogel | 250/83.3 R |
| 3,398,279 | 8/1968 | Gates, Jr. | 250/83.3 R |

Primary Examiner—Archie R. Borchelt
Attorney—Lee H. Kaiser, Robert B. Benson and Thomas F. Kirby

[57] ABSTRACT

A radiation monitor has a low-loss integrating capacitor connected to be charged by the output of a radiation sensor, a high input impedance operational amplifier operating in the inverting mode connected across the integrating capacitor, and a reference voltage source applied to the noninverting input, whereby the operational amplifier is initially in positive saturation and switches to negative saturation when the charge across the capacitor equal the reference voltage. Means responsive to the negative saturation output of the operational amplifier are provided to discharge the integrating capacitor and to generate a pulse, and a pulse counter gives an indication of total radiation received by the sensor. A second high input impedance operational amplifier operating in the inverting mode has its inverting input connected to one electrode of the integrating capacitor and holds it at zero potential, and a current meter driven by the output of the second operational amplifier provides an analog indication of the current from the radiation sensor flowing through the integrating capacitor and is calibrated in roentgens per minute received by the sensor.

12 Claims, 3 Drawing Figures

Inventors
Tom R. Thiele
Lester O. Gerlach
Thomas P. Gilmore
By Thomas F. Kirby
Attorney

3,671,746

STABLE, LOW LEVEL RADIATION MONITOR

This invention relates to radiation monitors.

Apparatus for detecting and measuring radiation is well known, but prior art radiation monitoring apparatus are often unstable and quickly lose calibration. Certain known radiation monitors have extremely high input resistance and are subject to drift and inaccuracies from aging, leakage and change in gain or in input characteristics. Further, known radiation monitors which indicate both radiation level and total roentgens received do not give constant and accurate readings when located at a distance from the radiation sensor and coupled thereto through a cable.

It is an object of the invention to provide an improved radiation monitor which minimizes drift even when measuring low radiation levels, is exceptionally stable, and maintains its calibration over a long period of time. Another object of the invention is to provide such a radiation monitor which indicates both radiation level and the total number of roentgens received. Still another object is to provide such a radiation monitor having improved coupling means between the radiation sensor and the indicating equipment remote from the sensor which provides stable and accurate readings of both radiation level and total roentgens received.

Figure 2A:
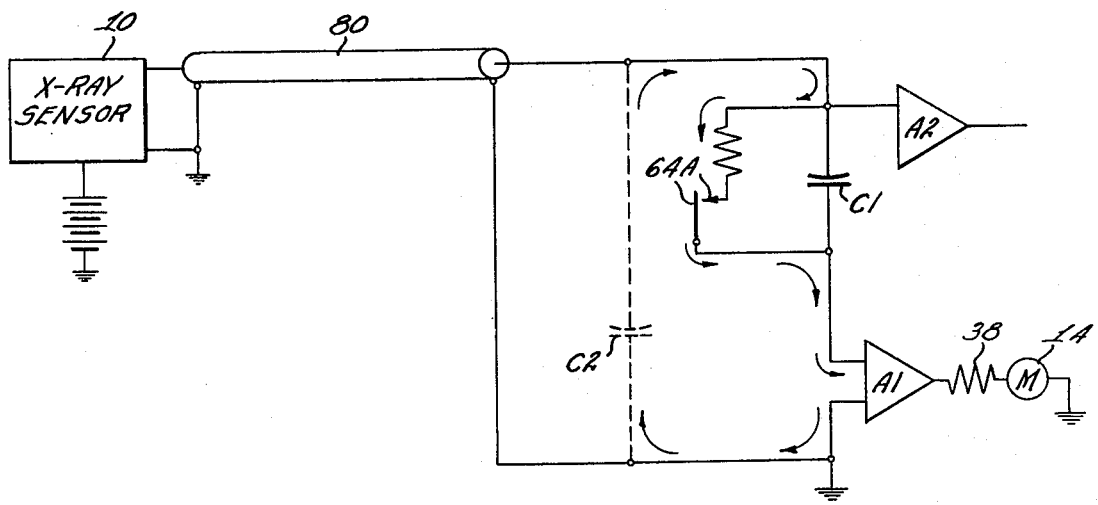
Figure 2B:
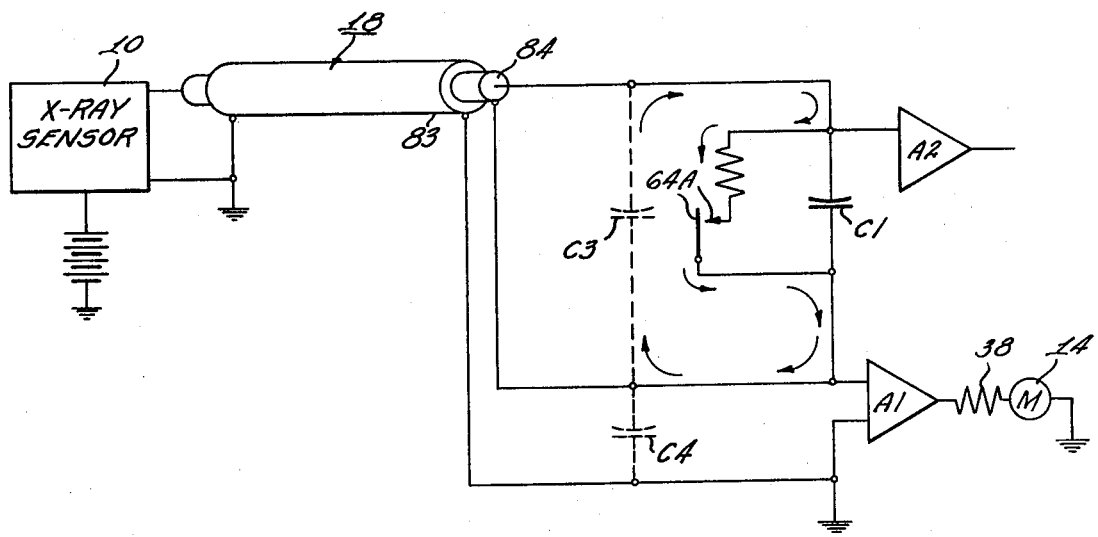

These and other objects and advantages of the invention will be more readily apparent from the following detailed description when considered in conjunction with the accompanying drawing wherein:

FIG. 1 is a schematic circuit diagram of a preferred embodiment of radiation monitor embodying the invention; and FIGS. 2A and 2B are partial schematic circuit diagrams respectively illustrating a coupling cable defect of prior art radiation monitors and the arrangement of the present invention which overcomes such defect.

The preferred embodiment of the invention will be described as a monitor for a betatron which provides both X-ray and electron outputs. The monitor of the invention has both an X-ray sensor 10 and an electron sensor 11, both of which are shown in block form, and permits selective monitoring of either X-ray or electrons. Such a radiation sensor is well known and may comprise a sealed container filled with a gas and enclosing a pair of electrodes with a potential difference therebetween. As a charged particle or a quanta of electromagnetic radiation passes through the gas within the radiation sensor container, it loses sufficient energy to the gas atoms to ionize them, and the positive gas ions move to the negative electrode and the electrons move to the positive electrode to provide an output current proportional to the radiation.

The radiation monitor of the invention provides an indication of radiation level, or intensity in roentgens per minute on meter 14 and also provides an indication of total radiation received on a roentgen counter 15 shown in block form, both of which may be positioned several hundred feet from the radiation sensor 10 or 11. A relay 16 automatically selects X-ray or electron input to the radiation monitor, and closing of a switch 17 operated from control functions in the betatron system completes an energizing circuit from the +20V and −20V leads of a suitable regulated power supply (not shown) to the operating coil of relay 16. When relay 16 is released as shown in FIG. 1, the input to the radiation monitor is from X-ray sensor 10 through a triaxial cable 18 and the normally closed pair of contacts 19A of an input transfer relay 19. Operation of switch 17 by the controls in the betatron completes an energizing circuit to the operating coil of relay 16 which then closes its normally open contacts 16A to complete an energizing circuit to the operating coil of relay 19. Operation of relay 19 opens its contacts 19A and closes its normally open contacts 19B to transfer the input to the electron sensor 11 through a tri-axial cable 20 and contacts 19B.

Operation of relay 16 and closing of its contacts 16A also completes an energizing circuit to the operating coil of a gain setting relay 22. Operation of relay 22 opens its pairs of normally closed contacts 22A and 22B and closes its pairs of normally closed contacts 22C and 22D to change the gain of amplifiers A1 and A2 in the radiation monitor to values suitable for electron input as described hereinafter.

RADIATION LEVEL METER CIRCUIT

Assuming switch 17 is open and relays 29 and 22 are released as illustrated in FIG. 1, the output current from X-ray sensor 10 is proportional to X-ray radiation and flows through tri-axial cable 18, normally closed contacts 19A, a resistor 24, a low-loss polystyrene integrating capacitor C1, and a resistor 28 to the inverting input of an operational amplifier A1 and also through a resistor 30, normally closed contacts 22A of relay 22, and gain calibrating resistors 32 to the ground bus. Amplifier A1 is preferably of the field effect transistor type with very high input impedance so that no appreciable input current flows into amplifier A1 and substantially all the current passing through integrating capacitor C1 flows through resistances 30 and 32 in series to the ground bus. Amplifier A1 is connected in the inverting mode and tends to maintain zero potential difference between its input pins. Consequently, the inverting input of amplifier A1 is at zero volts, thereby holding the lower terminal of integrating capacitor C1 at essentially zero volts. Further, it will be noted that measuring of the current proportional to radiation is accomplished after said current flows through the integrating capacitor C1, and yet the circuit holds one terminal of the integrating capacitor C1 at zero potential. Amplifier A1 and resistor 30 comprise the basic current metering circuit which provides an analog of input current to the monitor that is a function of radiation level. The output of amplifier A1 is impressed across the series arrangement of a resistance 36 and resistance 32 to the ground bus, and the signal appearing at the junction of resistors 32 and 36 is fed back through resistor 30 to the inverting input of amplifier A1. The voltage drop generated across resistor 30 by the flow therethrough of current passing through integrating capacitor C1 is amplified by the ratio of resistance 36 to resistance 32. Operational amplifier A1 provides current gain and its output drives, through a resistor 38, a microammeter 14 calibrated in roentgens per minute. A capacitor 40 connected between the output pin and the inverting input pin of amplifier A1 suppresses noise and dampens meter 14. The disclosed arrangement permits input current proportional to radiation to flow through a resistor 30 of substantially less resistance than that of prior art radiation monitors and results in greater stability, minimum drift, substantial reduction in cost, and constant calibration over a long period while holding one terminal of an integrating capacitor at zero volts.

RADIATION INDICATOR

The input current from X-ray sensor 10 integrated by capacitor C1. Inasmuch as the input current is effectively coming from a high impedance current generator, a voltage is developed across integrating capacitor C1 in accordance with the equation $$e = 1/C \int i\, dt$$

The voltage across capacitor C1 may alternatively be represented as $$V_c = I_{in} \times \text{time}/C$$

where $C$ is the capacitance of capacitor C1. The voltage across capacitor C1 is thus the integral of the very low amperage current (for example, from 0.01 to 1.0 microamperes) from sensor 10 and time and is directly proportional to total roentgens of radiation received by X-ray sensor 10.

The voltage $V_c$ across integrating capacitor C1 is applied through a resistor 42 to the inverting input of a high impedance field effect transistor type operational amplifier A2 operated as a triggering device in a counter circuit. The voltage $V_T$ applied to the noninverting input of amplifier A2 is developed across a portion of a voltage divider comprising resistors 44, 45, 46 and potentiometer 47 connected in series by relay contacts 22B across the leads +15V and ground. The reference voltage $V_T$ developed at the junction of resistors 45 and 46 is initially greater than the voltage $V_c$ across integrating capacitor C1. Inasmuch as amplifier A1 holds the lower terminal of integrating capacitor C1 at zero potential, the voltage $V_T$ can be referenced to ground.

The base of a transistor 48 is connected to the output terminal of amplifier A2 through a resistor 49, and its emitter-collector circuit is connected in series with a diode 51 and two resistors 53 and 54 across the +15V and −20V leads of the power supply (not shown). Since $V_T$ is initially greater than $V_c$, operational amplifier A2 is forced into positive saturation and provides maximum positive output which reverse biases the base of transistor 48 and turns it off. When the voltage across integrating capacitor C1 rises, due to the input current from X-ray sensor 10, until $V_c$ is equal to reference voltage $V_T$, amplifier A2 switches from maximum positive output to maximum negative output and turns transistor 48 fully on. Positive feedback through the series arrangement of a capacitor 56 and a resistor 57 connected between the output of amplifier A2 and the noninverting input provide rapid switching.

The emitter-collector circuit of a transistor 60 is connected in series with a diode 61 and the operating coil of a relay 62 across the +20V and −20V leads of the power supply. The emitter-collector circuit of transistor 60 is also connected in series with the operating coil of a relay 64 across the +20V and −20V leads of the power supply. The base of transistor 60 is connected to the junction of resistors 53 and 54. When transistor 48 is turned on by the output from amplifier A2, the current through the emitter-collector circuit of transistor 48 flows through resistor 54 and develops a voltage which forward biases transistor 60 into conduction. The current flow through the emitter-collector circuit of transistor 60 energizes the operating coil of relay 64 which operates and closes its contacts 64A. Closing of contacts 64A short circuits integrating capacitor C1, thereby resetting $V_c$ to zero and causing amplifier A2 to switch back to its positive saturation state. Relay 64 releases immediately after amplifier A2 switches back to its original state.

The current flow through the emitter-collector circuit of transistor 60 also energizes the operating coil of relay 62 which closes its contacts 62A to connect counter 15 in series with two resistors 67 and 68 across the leads of a suitable 120 volt alternating current power supply. The resulting current flow through resistor 68 develops a gating voltage which is applied to the gate of a controllable semiconductor device 70 adapted to conduct current in both directions and is commercially available under the trademark TRIAC. The voltage applied to the gate of TRIAC controllable semiconductor 70 triggers it into conduction and generates a pulse that actuates counter 15 which may be of the electro-mechanical type that indicates the number of pulses received and also actuates a pair of contacts (not shown) after it receives a preset number of electrical input impulses. Such a counter 15 is commercially available under the designation "HZ" Series Microflex Reset Counter from E. N. Bliss Company. The number of pulses indicated by counter 15 is directly proportional to total roentgens of radiation received by X-ray sensor 10, and it will be appreciated that counter 15 may, if desired, control shutting off of the betatron through operation of its contacts (not shown) after a predetermined number of pulses are generated by the disclosed counting circuit and controllable semiconductor 70.

A delay network, including a transistor 72 connected across the series arrangement of diode 61 and transistor 60, is provided to hold relay 62 operated and its contacts 62A closed for a sufficient length of time to assure that counter 15 is operated. The turning of transistor 60 on operates both relays 62 and 64 and discharges capacitor 65 through diode 67 and resistor 69. When transistor 60 turns off, current passing through relay 62 flows through resistor 69, capacitor 65, and the base of transistor 72 to turn it on, thus hold relay 62 operated. Diode 61 isolates relay 64 from relay 62 so that current flow through the emitter-collector circuit of transistor 72 holds relay 62 operated for a sufficient time to insure operation of counter 15 even though relay 64 releases immediately after amplifier A2 switches back to its positive saturation state. Capacitor C1 can then be integrating input current from radiation sensor 10 even while counter 15 is being operated, thereby guaranteeing that the indication by counter 15 is an accurate measure of the total radiation received by sensor 10.

Closing of switch 17 will result in operation of relays 16, 19, and 22 as described above. Relay 19 will open contacts 19A and close contacts 19B to transfer the input to electron sensor 11. Relay 22 will open contacts 22A and close contacts 22C to connect a resistance 78 in series with resistance 36, thereby changing the gain of amplifier A1 to the proper value for electron input. Relay 22 will also open contacts 22B and close contacts 22D to connect a potentiometer 79 in series with resistance 46 to the noninverting input of amplifier A2, thereby changing the gain of amplifier A2 to the proper value for electron input.

The input current from radiation sensor 10 or 11 may be in the range from 0.01 to 1.0 microamperes, and in practice the sensor 10 or 11 may be 100 feet or greater from the control panel in which the radiation level and total radiation monitors are mounted. The small current values and the long distance between sensor and indicators necessitates shielded input cable to eliminate interference from external sources. Prior art shielded cable arrangements for radiation monitors were unsatisfactory because the radiation level meter jumped and gave an erroneous reading every time the integrating capacitor was discharged. We have found that such erroneous reading of the radiation level meter is caused by the shielded cable capacitance which appears in common to the integrating capacitor and the radiation level indicating circuit. In prior art radiation monitors, a single coaxial cable such as 80 shown in FIG. 2A coupled a radiation sensor such as X-ray sensor 10 to both a radiation level indicator and a total radiation monitor at a location remote from sensor 10. Assuming that the radiation monitor having amplifiers A1 and A2 as hereinbefore disclosed is coupled through such prior art coaxial shielded cable 80 to radiation sensor 10 as illustrated in FIG. 2A, it will be appreciated that as the charge on integrating capacitor C1 builds up as a result of input current from sensor 10 conducted over coaxial cable 80, the voltage developed across C1 in series with amplifier A1 also appears across the cable capacitance C2 shown in dotted lines. When C1 is short circuited and discharged, the full voltage of the cable capacitance C2 appears across the input to amplifier A1 (as shown by the arrows in FIG. 2A illustrating direction of current discharge) and causes a sudden increase of current through amplifier A1 and a resulting jump in the reading of the radiation level meter 14.

FIG. 2B schematically illustrates the preferred embodiment of the invention wherein a double axially shielded (triaxial) cable 18 couples the radiation sensor such as X-ray sensor 10 to amplifiers A1 and A2. The outer shield 83 of cable 18 is connected to the ground bus, and the inner shield 84 is connected to the lower terminal of integrating capacitor C1 and to the inverting input of amplifier A1. FIG. 2B illustrates that the cable capacitance between the central conductor and the inner shield 84, shown in dotted lines as C3, is in parallel with integrating capacitor C1, and the cable capacitance between inner shield 84 and outer shield 83, shown in dotted lines as C4, is in shunt to the input pins of amplifier A1. Consequently, the charge built up across integrating capacitor C1 by the input current during counting appears only across C3, while the charge across C4 is held close to zero by the infinite gain of amplifier A1.

When integrating capacitor C1 is short circuited and discharged, the charge across cable capacitance C3 is also dissipated (by current flow in the arrow direction illustrated in FIG. 2B) without flowing through the current measuring circuit of amplifier A1, thereby preventing jumping of radiation level meter 10 during counting.

It should be understood that we do not intend to be limited to the particular embodiments shown and described for many modifications will be obvious to those skilled in the art.

The embodiments of the invention in which an exclusive property or privilege is claimed are defined as follows:

1. A current measuring circuit having high stability and minimum drift comprising, in combination,
   a source of current of very low magnitude,
   a low-loss integrating capacitor connected to be charged by said current from said source,
   a high input impedance operational amplifier having one input coupled to said integrating capacitor,
   means for applying a reference voltage to the other input of said operational amplifier, whereby said operational amplifier is initially in saturation of one polarity and is forced into saturation of the opposite polarity when the voltage across said integrating capacitor builds up to said reference voltage,
   means responsive to said opposite polarity saturation output of said operational amplifier for discharging said integrating capacitor and for generating an electrical pulse, and
   a pulse counter coupled to said pulse generating means.

2. A measuring circuit in accordance with claim 1 and including a second high input impedance operational amplifier connected in the inverting mode and having its inverting input coupled to one electrode of said integrating capacitor, whereby said one electrode of said integrating capacitor is maintained at zero potential, and
   electroresponsive indicating means coupled to the output of said second operational amplifier for providing an analog indication of the current from said source flowing through said integrating capacitor.

3. A measuring circuit in accordance with claim 2 wherein said second operational amplifier has a feedback resistance between its output and its inverting input and including a resistor connected between a point intermediate the ends of said feedback resistance and ground, whereby said current passing through said integrating capacitor flows through a portion of said feedback resistance and said resistor to ground.

4. A measuring circuit in accordance with claim 3 and including a triaxial shielded cable having a central conductor coupling said current source to said integrating capacitor and concentric radially inner and radially outer shields surrounding said conductor and wherein said inner shield is coupled to said inverting input of said second operational amplifier.

5. A radiation monitor comprising, in combination,
   a radiation sensor,
   a low-loss integrating capacitor connected to be charged by the output of said sensor,
   a high input impedance operational amplifier having its inverting input coupled to said integrating capacitor,
   a reference voltage source connected to the noninverting input of said operational amplifier, whereby said operational amplifier is initially in positive saturation and switches to negative saturation when the charge on said capacitor builds up to a predetermined voltage,
   means coupled to the output of said operational amplifier for discharging said integrating capacitor when said operational amplifier switches to negative saturation,
   a pulse counter,
   and means having its output coupled to said pulse counter and responsive to the negative saturation output of said operational amplifier for generating an output pulse.

6. A radiation monitor in accordance with claim 5 and including a second high input impedance operational amplifier connected in the inverting mode and having its inverting input coupled to one electrode of said integrating capacitor, whereby said one electrode is held at zero potential, and
   indicating current meter means driven by the output of said second operational amplifier for providing an analog indication of the input current from said radiation sensor.

7. A radiation monitor in accordance with claim 6 wherein said second operational amplifier has a feedback resistance between its output and its inverting input and including a resistor connected between a point intermediate the ends of said feedback resistance and ground, whereby said current passing through said integrating capacitor flows through a portion of said feedback resistance and said resistor to ground.

8. A radiation monitor comprising, in combination,
   a radiation sensor,
   a low-loss integrating capacitor connected to be charged by the output of said radiation sensor,
   means including a first high input impedance operational amplifier having an input connected across said integrating capacitor for indicating the charge built up across said integrating capacitor as a measure of total radiation received by said sensor,
   a second high input impedance operational amplifier connected in the inverting mode with a feedback resistance between the output and the inverting input thereof,
   said inverting input of said second operational amplifier being coupled to one electrode of said integrating capacitor, whereby said one electrode is maintained at zero volts, and
   electroresponsive indicating means coupled to the output of second operational amplifier for providing an analog indication of the current from said radiation sensor flowing through said integrating capacitor.

9. A radiation monitor in accordance with claim 8 and including a resistor connected between a point intermediate the ends of said feedback resistance and ground, whereby said current passing through said integrating capacitor flows through a portion of said feedback resistance and said resistor to ground.

10. A radiation monitor in accordance with claim 8 wherein said means for indicating the charge built up across said capacitor includes
    means coupled to the output of said first operational amplifier for providing an output signal in response to a predetermined voltage across said integrating capacitor,
    means responsive to said output signal for discharging said integrating capacitor,
    means responsive to said output signal for generating a pulse, and
    a pulse counter coupled to said pulse generating means.

11. A radiation monitor in accordance with claim 9 wherein said first operational amplifier has its inverting input coupled to said integrating capacitor and said means for indicating the charge built up across said integrating capacitor includes
    means for applying a reference voltage to the noninverting input of said first operational amplifier, whereby said first operational amplifier is initially in positive saturation and is forced into negative saturation when the voltage across said integrating capacitor builds up to said reference voltage,
    means responsive to the negative saturation output of said first operational amplifier for generating a pulse and for discharging said integrating capacitor, and
    a pulse counter coupled to said pulse generating means.

12. A radiation monitor in accordance with claim 11 and including a triaxial cable having an inner and an outer shield and coupling said radiation sensor to said integrating capacitor, said inner shield of said triaxial cable being coupled to said inverting input of said second operational amplifier.

* * * * *